United States Patent
Blachman et al.

(10) Patent No.: US 9,111,268 B2
(45) Date of Patent: Aug. 18, 2015

(54) SYSTEMS AND METHODS FOR DATA ACQUISITION AND TRANSMISSION

(75) Inventors: Steven Joel Blachman, Pflugerville, TX (US); James M. Canter, Austin, TX (US); Jon Sven Knudson, Austin, TX (US)

(73) Assignee: CRANE MERCHANDISING SYSTEMS, INC., Bridgeton, MO (US)

( * ) Notice: Subject to any disclaimer, the term of this patent is extended or adjusted under 35 U.S.C. 154(b) by 1515 days.

(21) Appl. No.: 12/132,981

(22) Filed: Jun. 4, 2008

(65) Prior Publication Data

US 2009/0303982 A1 Dec. 10, 2009

(51) Int. Cl.

| | |
|---|---|
| G06F 15/16 | (2006.01) |
| H04L 12/66 | (2006.01) |
| G06Q 20/20 | (2012.01) |
| G07F 5/18 | (2006.01) |
| G07F 9/02 | (2006.01) |
| G07F 11/00 | (2006.01) |
| H04L 29/08 | (2006.01) |

(52) U.S. Cl.
CPC ...... *G06Q 20/20* (2013.01); *G07F 5/18* (2013.01); *G07F 9/026* (2013.01); *G07F 11/002* (2013.01); *H04L 67/04* (2013.01); *H04L 67/125* (2013.01)

(58) Field of Classification Search
USPC .......... 370/352; 700/223; 709/217, 230; 705/10; 221/9
See application file for complete search history.

(56) References Cited

U.S. PATENT DOCUMENTS

| | | | |
|---|---|---|---|
| 4,611,205 A | 9/1986 | Eglise | 340/825.35 |
| 6,109,524 A | 8/2000 | Kanoh et al. | 235/381 |
| 6,119,053 A | 9/2000 | Taylor et al. | 700/231 |
| 6,427,912 B1 | 8/2002 | Levasseur | 235/381 |
| 7,076,329 B1 | 7/2006 | Kolls | 700/232 |
| 7,131,575 B1 | 11/2006 | Kolls | 235/379 |
| 7,191,034 B2 | 3/2007 | Whitten et al. | 700/244 |
| 7,286,901 B2 | 10/2007 | Whitten et al. | 700/244 |
| 7,542,721 B1 * | 6/2009 | Bonner et al. | 455/41.2 |
| 7,787,382 B2 * | 8/2010 | Strutt et al. | 370/238 |
| 2001/0034566 A1 | 10/2001 | Offer | 700/236 |
| 2002/0016829 A1 * | 2/2002 | Defosse | 709/217 |
| 2002/0077724 A1 | 6/2002 | Paulucci et al. | 700/231 |
| 2003/0050841 A1 | 3/2003 | Preston et al. | 705/16 |

(Continued)

OTHER PUBLICATIONS

Cashless—Definition from the Merriam-Webster Online Dictionary; 2 pages, Printed Sep. 9, 2008.

*Primary Examiner* — Nicholas Jensen

(57) ABSTRACT

In a system for a field asset site having a plurality of field assets, a first transport module interfaces with a first field asset, the first transport module operable to communicate via a first transport with a communication center outside of the field asset site. A second transport module interfaces with the first field asset. A third transport module interfaces with an associated field asset and is operable to communicate via a second transport to the second transport module. Each of a plurality of audit devices interfaces with an associated field asset from which operation data is acquired by the audit device. Each of a plurality of routing modules interfaces between an associated field audit device and at least one of the second transport module and the third transport module, with each routing module operable to provide transport-agnostic communication between its associated audit device and at least one of the communication center and another audit device.

24 Claims, 7 Drawing Sheets

(56) References Cited

U.S. PATENT DOCUMENTS

| | | | |
|---|---|---|---|
| 2003/0169180 A1* | 9/2003 | Hardman | 340/870.01 |
| 2005/0131577 A1 | 6/2005 | Ota et al. | 700/242 |
| 2005/0221834 A1* | 10/2005 | Kangas et al. | 455/452.1 |
| 2006/0106490 A1* | 5/2006 | Howell et al. | 700/233 |
| 2007/0013547 A1* | 1/2007 | Boaz | 340/870.02 |
| 2007/0083287 A1* | 4/2007 | Defosse et al. | 700/236 |
| 2007/0136125 A1* | 6/2007 | Godwin et al. | 705/10 |
| 2008/0083770 A1* | 4/2008 | Godwin et al. | 221/9 |

* cited by examiner

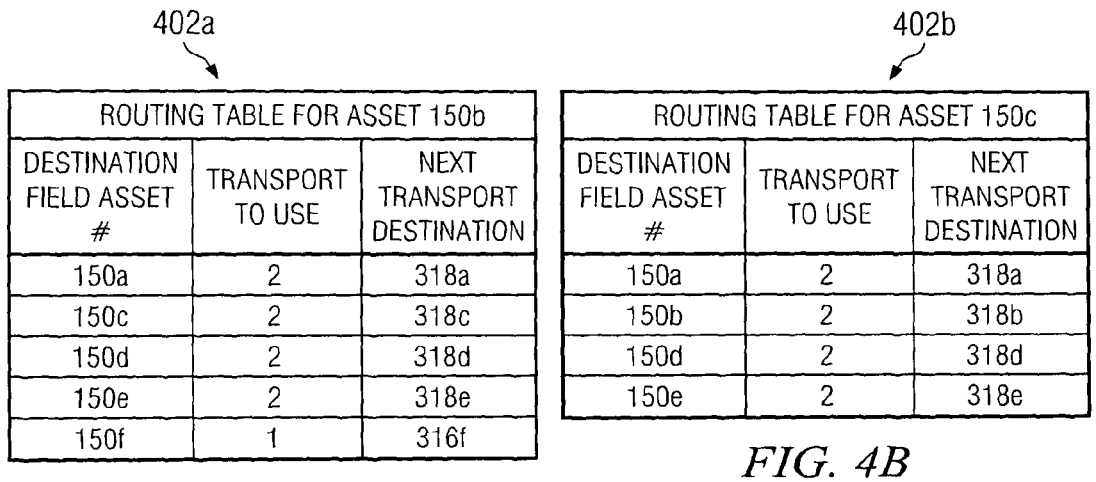
*FIG. 4A*
*FIG. 4B*
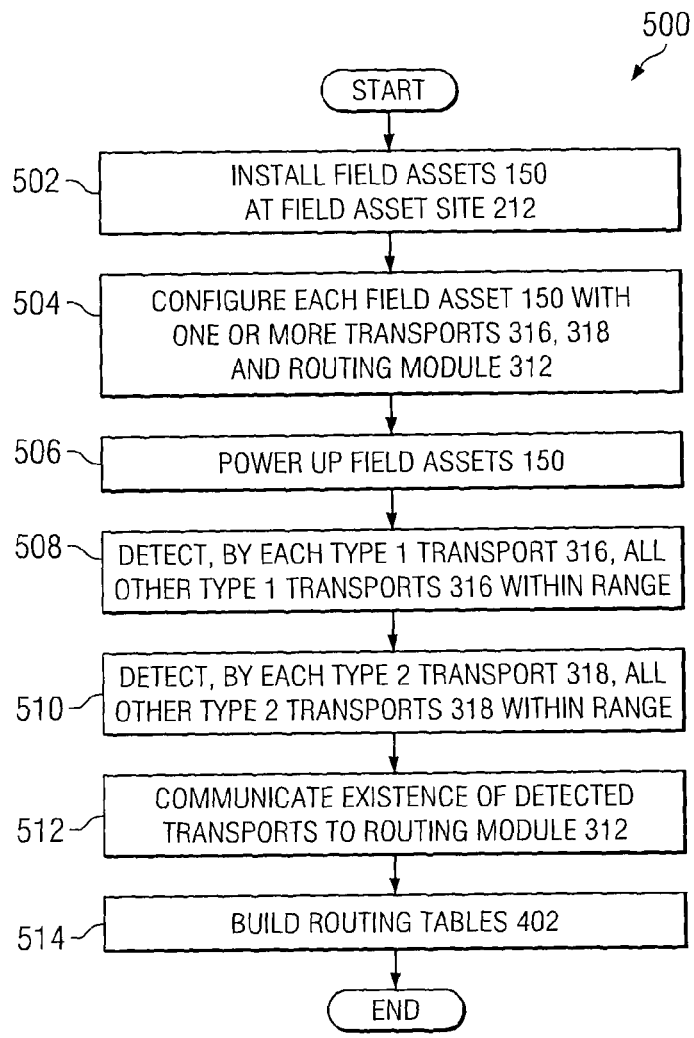
*FIG. 5*

United States Patent US 9,111,268 B2

SYSTEMS AND METHODS FOR DATA ACQUISITION AND TRANSMISSION

TECHNICAL FIELD

Systems and methods are provided to allow communication with and between field assets, including without limitation, using multiple networks, communications transports, and communication paths. More particularly, systems and methods are provided to provide for transport-agnostic communication among field assets.

BACKGROUND OF THE INVENTION

Modern, electronic vending machines often contain microprocessor based control systems, sometimes referred to as "vending machine controllers." Such systems may be used to control, monitor and record detailed information about the state of an associated vending machine including, but not limited to, sales, cash received and paid out, errors, events, temperatures, inventory change, lock and unlock. A vending machine controller (VMC) may also control, monitor and record information from peripheral devices associated with functions such as coin acceptance, change giving, displays, credit cards and wireless transactions. The European Vending Association's Data Transfer Standard ("EVA-DTS") and the National Automatic Merchandising Association's (NAMA) Multi-Drop Bus/Internal Communications Protocol (MDB/ICP or MDB) are widely used formats for collecting, recording, transmitting and auditing data associated with vending machines.

Advances in electronics are now enabling the use of computer controls and data acquisition systems within each vending machine. Some of the latest vending machines make it possible for vending operators to download data and information associated with sales, inventory, and equipment status on-site onto portable computers or transmit vending machine data and information to a central location such as a network operations center. Many vending machines include vending machine controllers based on the International Multi-drop Bus Interface Standards developed by the National Automatic Merchandising Association (NAMA).

Advances in electronics have also enabled the use of controls and data acquisition systems in other types of field assets, including without limitation service vehicles, snack machines, beverage machines, automatic teller machines (ATMs), postage stamp dispensers, arcade machines, slot machines, laundry machines and car wash equipment, in addition to vending machines.

However, there are many known disadvantages to such control and data acquisition systems in field assets. For example, in many control and data systems in which it is desired to control a plurality of field assets, it may be advantageous from a cost perspective that different types of communications media and/or protocols be used on field assets located at a particular site. However, building a control and data acquisition system that supports different communication transports may lead to complexity and difficulty in maintaining such a system, especially for field asset service technicians that may not be knowledgeable regarding network management.

SUMMARY OF THE DISCLOSURE

Therefore, a need has arisen for systems and methods providing for transport-agnostic communication between field assets. In accordance with teachings of the present disclosure, systems and methods may be presented providing for transport-agnostic communication between field assets.

In one embodiment of the present disclosure, a data acquisition and transmission system for a field asset site having a plurality of field assets may include a first transport module, a second transport module, a third transport module, a plurality of audit devices, and a plurality of routing modules. The first transport module may interface with a first field asset, the first transport module operable to communicate via a first transport with a communication center outside of the field asset site. The second transport module may interface with the first field asset. The third transport module may interface with an associated field asset and may be operable to communicate via a second transport to the second transport module. Each of the plurality of audit devices may interface with an associated field asset from which operation data is acquired by the audit device. Each of the plurality of routing modules may interface between an associated field audit device and at least one of the second transport module and the third transport module, with each routing module operable to provide transport-agnostic communication between its associated audit device and at least one of the communication center and another audit device.

In accordance with another embodiment of the present disclosure, a remote data acquisition and transmission system for field assets at a field asset site may comprise a plurality of audit devices, a plurality of routing modules, a first transport module, and a plurality of second transport modules. Each of the plurality of audit devices may interface with a field asset from which operation data is acquired by the audit device. Each of the plurality of routing modules may interface with an associated audit device. The first transport module may interface with one of the plurality of audit devices, and may be operable to communicate via a first transport with a communication center outside of the field asset site. The plurality of second transport modules may interface with the plurality of routing modules, each second transport module operable to communicate with its associated routing module and, via a second transport, communicate with at least one other second transport module to form a transport-agnostic local area network among the field assets. The communication center may communicate with the first transport module to receive the operation data acquired by the audit devices. The routing modules and the second transport modules may operate to autoconfigure the local area network upon initialization. In addition, the routing modules and second transport modules may operate as relays when necessary to establish communication among the communication center and the field assets.

In accordance with a further embodiment of the present disclosure, a method for data acquisition and transmission in a field asset site is provided. Each of a plurality of audit devices may be interfaced with at least one field asset from which operation data is acquired by the audit device. Each of a plurality of routing transports may be interfaced with an associated audit device. A first transport module may be interfaced with one of the plurality of audit devices. A plurality of second transport modules may be interfaced with the plurality of routing modules. A communication center outside of the field asset site and the audit device interfacing with the first transport module may communicate via the first transport module using a first transport. The audit device interfacing with the first transport module and all other audit devices interfacing with routing modules interfacing with second transport modules may communicate via the second transport modules and their associated routing modules using a second transport, between the audit device interfacing with the first transport module and all other audit devices interfacing with routing modules interfacing with second transport modules. The communication among audit devices may be transport-agnostic from the standpoint of the audit devices.

Technical benefits of the present disclosure may include eliminating or substantially reducing hardware costs and network complexity associated with a field asset site. All, some or none of these technical advantages may be present in various embodiments of the present disclosure. Other technical advantages will be readily apparent to one skilled in the art from studying the following figures, descriptions and/or claims.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein:

FIGS. 4A and 4B illustrate example routing tables that may be maintained on a field asset, in accordance with the present disclosure;

FIG. 5 illustrates a flow chart of an example method for a building a routing table, in accordance with the present disclosure;

DETAILED DESCRIPTION OF THE DISCLOSURE

Figure 1:
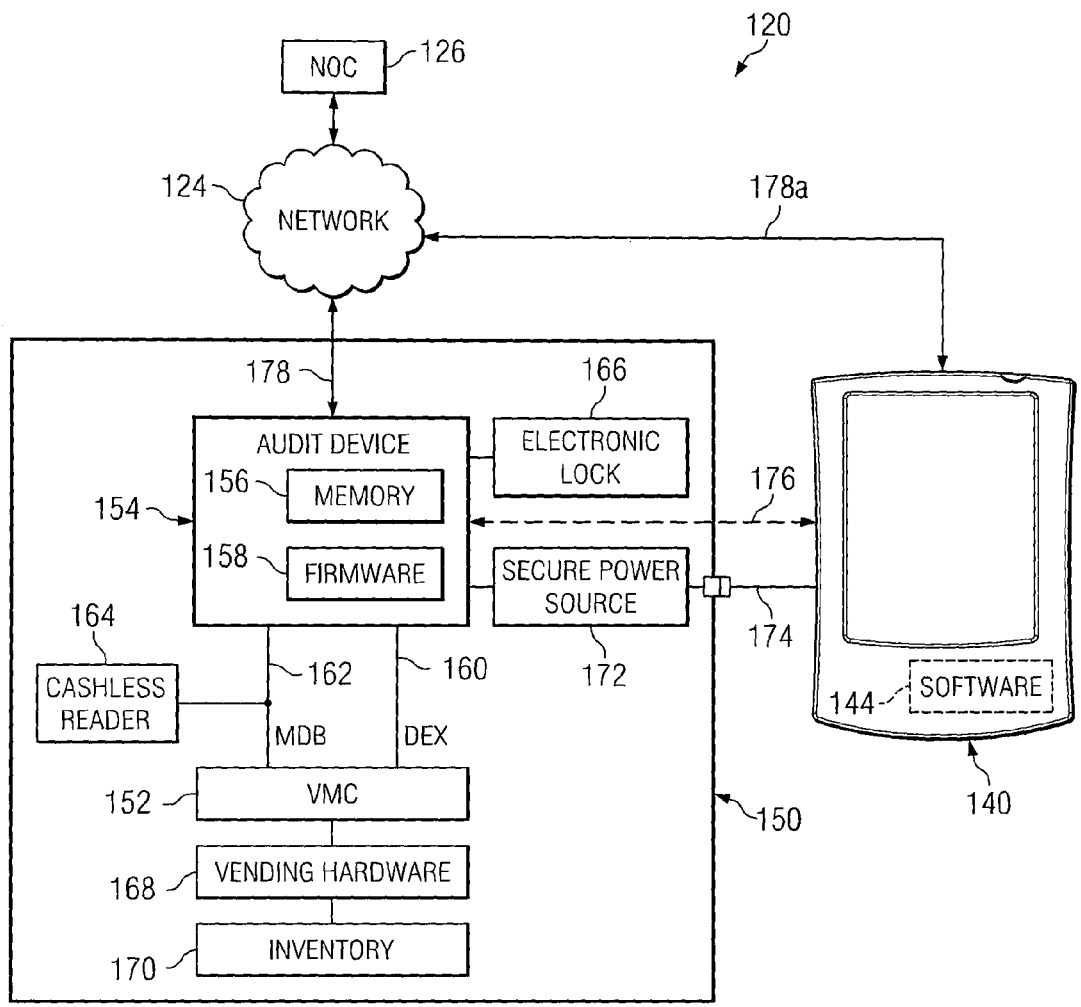
FIG. 1 illustrates a schematic drawing showing a block diagram of portions of an example system for collecting, storing and communicating data and other information associated with operation of a field asset such as, but not limited to, vending machines, in accordance with the present disclosure.

Preferred embodiments of the disclosure and various advantages are best understood by reference to FIGS. 1-8 wherein like numbers refer to same and like parts.

Various aspects of the present disclosure may be described with respect to remotely located equipment, mobile storage containers, mobile electronic controllers and/or handheld devices. However, various features and teachings of the present disclosure may be satisfactorily used with fixed storage containers having valuable objects disposed therein. Also, various embodiments of the present disclosure may not require the use of a handheld device but may instead utilize a personal computer, general purpose computer, or other suitable device.

The term "field asset" may be used in this application to refer to any automatic sales machine that allows payment to be exchanged for goods or services including, but not limited to, all types of service vehicles, vending machines, snack machines, beverage machines, automatic teller machines (ATMs), postage stamp dispensers, arcade machines, slot machines, laundry machines and car wash equipment. The term "field asset" may also be used to describe any type of equipment operated by use of a key or any enclosure, building or other secured space which may be opened using a key.

The term "wire-line transmissions" may be used to refer to all types of electromagnetic communications over wires, cables, or other types of conduits. Examples of such conduits include, but are not limited to, metal wires and cables made of copper or aluminum, fiber-optic lines, and cables constructed of other metals or composite materials satisfactory for carrying electromagnetic signals. Wire-line transmissions may be conducted in accordance with teachings of the present disclosure over electrical power lines, electrical power distribution systems, building electrical wiring, conventional telephone lines, ethernet cabling (10baseT, 100baseT, etc.), coaxial cables, T-1 lines, T-3 lines, ISDN lines, ADSL, etc.

The term "wireless transmissions" may be used to refer to all types of electromagnetic communications which do not require a wire, cable, or other types of conduits. Examples of wireless transmissions which may be used include, but are not limited to, personal area networks (PAN) (e.g., BLUETOOTH), local area networks (LAN), wide area networks (WAN), narrowband personal communications services (PCS), broadband PCS, circuit switched cellular, cellular digital packet data (CDPD), radio frequencies, such as the 800 MHz, 900 MHz, 1.9 GHz and 2.4 GHz bands, infra-red and laser.

Examples of wireless transmissions for use in local area networks (LAN) include, but are not limited to, radio frequencies, especially the 900 MHZ and 2.4 GHz bands, for example IEEE 802.11 and BLUETOOTH, as well as infrared, and laser. Examples of wireless transmissions for use in wide area networks (WAN) include, but are not limited to, narrowband personal communications services (nPCS), personal communication services (PCS such as CDMA, TMDA, GSM) circuit switched cellular, and cellular digital packet data (CDPD), etc.

The term "computer-readable media" may be used to refer to any instrumentality, or aggregation of instrumentalities that may retain data and/or instructions for a period of time. Computer-readable media may include, without limitation, random access memory (RAM), read-only memory (ROM), electrically erasable programmable read-only memory (EEPROM), a PCMCIA card, flash memory, direct access storage (e.g., a hard disk drive or floppy disk), sequential access storage (e.g., a tape disk drive), compact disk, CD-ROM, DVD, and/or any suitable selection of volatile and/or non-volatile memory and/or storage.

The term "transport" may be used to refer to any suitable data communication and/or transmission protocol, standard, data link, and/or transport, that may use wireless transmissions or wire-line transmissions for the communication of data. A transport may include, without limitation, a PAN interface, LAN interface, WAN interface, narrowband PCS interface, broadband PCS interface, circuit switched cellular interface, CDPD interface, radio frequencies frequency interface, (e.g., the 800 MHz, 900 MHz, 1.9 GHz and 2.4 GHz bands), infra-red interface, laser interface, 802.11 interface, BLUETOOTH interface, and/or any other suitable interface.

FIG. 1 is a schematic drawing showing a block diagram of portions of an example system 120 for collecting, storing and communicating data and other information associated with operation of a field asset such as, but not limited to, vending machines. The data may include the status of various components associated with the field asset and transactions conducted at the field asset including, but not limited to, acceptance of cash and cashless payments, vending of inventory, and/or many other events.

Data collecting, storing and communication system 120 may be satisfactorily used with vending machine 150 and/or other types of field assets. System 120 may include one or more handheld integration audit devices (handheld devices) 140. Vending machine 150 may include vending machine controller (VMC) 152 operable to control and monitor various electronic components and mechanical components associated with vending machine 150. Vending machine 150 may also include audit device 154 having memory 156 and firmware 158.

Audit device 154 may be operable to obtain DEX data via DEX interface or communication link 160 from vending machine controller 152. Audit device 154 may also be operable to obtain multi-drop bus (MDB) data via MDB interface or communication link 162 from vending machine controller 152. Audit device 154 may also obtain MDB data from various peripherals including, but not limited to, cashless reader 164. Audit device 154 may archive or store the DEX data and MDB data in memory 156.

Audit device 154 of vending machine 150 may be operable to communicate with handheld device 140. For some applications, handheld device 140, and/or audit device 154 may be equipped with one or more wireless transceivers. Examples of wireless communications that may be satisfactorily used with handheld device 140 and audit device 154 include, but are not limited to, BLUETOOTH, IEEE802.11a, IEEE802.11b and IEEE802.11g. For some applications handheld device 140 and/or audit device 54 may include and/or may be communicatively coupled to respective BLUETOOTH transceivers (not expressly shown).

Communication link or interface 174 such as shown in FIG. 1 may allow communication of electrical signals between handheld device 140 and audit device 154. Also, link 174 may provide electrical power from secure power source 172 to handheld device 140. Alternatively, in the event of an emergency at vending machine 150, handheld device 140 may provide electrical power through link 174 to operate audit device 154. Such wire-line connections may provide multiple redundancy with respect to the data communication and supplying power required to operate handheld device 140 and/or audit device 154.

When handheld device 140 and audit device 154 communicate with each other over wire-line link 174 or wireless communication link 176, DEX data and MBD data stored in memory 156 may be transferred on demand to handheld device 140. In addition to DEX data and MDB data, audit device 154 may record and store other transactions or activities associated with vending machine 150. For example audit device 154 may record information concerning transactions such as the frequency, date and time and the identity of each engagement and disengagement of electronic lock 166. In addition, audit device 154 may record operational matters such as compressor failure, vend failures, inventory depletion, correct change events, user selected events as well as other data associated with modern electronic vending machine activities and transactions.

Vending machine 150 may include one or more hardware devices or peripheral devices operable to accept cash, noncash payment tokens and/or wireless payments. Cashless reader 164 may be representative of such hardware devices and peripherals. Cashless reader or cashless media device 164 may be operable to accept noncash payment tokens such as credit cards, RFID (Radio Frequency Identification Devices) or other media representative of noncash payment.

Vending machine 150 may include electronic lock 166 operably coupled with audit device 154. Electronic lock 166 may be commanded to engage or disengage in response to signals from audit device 154. Audit device 154 may operate electronic lock 166 by supplying appropriate power and/or digital control signals thereto. For example, audit device 154 may receive a command from handheld device 140 to initiate a sequence for unlocking electronic lock 166. Some vending machines and other types of remotely located equipment associated with data collecting, storing and communication system 120 may have only a mechanical locking device (not expressly shown) operated by a conventional key.

For some applications an electronic key (not expressly shown) may be used to initiate opening of an electronic lock. For such applications portions of an electronic reader (not expressly shown) may be disposed on exterior portions of vending machine 150. The electronic reader may be operable to respond to an electronic key and send an appropriate signal to audit device 154 to initiate a sequence for unlocking electronic lock 166.

The unlocking sequence may include a request from audit device 154 to electronic lock 166 to obtain a serial number associated with electronic lock 166. Audit device 154 may use a serial number or other information associated with electronic lock 166 to confirm that the electronic key is authorized for use in opening electronic lock 166 and associated vending machine 150. Handheld device 140 may also be used to initiate an unlocking sequence via audit device 154.

Vending machine 150 may include vending hardware 168 and inventory 170. Examples of vending machine hardware 168 may include, but are not limited to, one or more inventory dispensing apparatus, one or more coin acceptance and verification mechanisms, one or more bill acceptance and validation mechanisms or any other hardware device associated with vending machines. Vending machine 150 may also include secure power source 172 operably coupled to audit device 154. For some applications secure power source 172 may be used to provide power to audit device 154 in the event of power failure to vending machine 150 or at other selected time periods.

As shown in FIG. 1, secure power source 172 may be connected with handheld (handheld device) 140 via link or interface 174. Link or interface 174 may include a contact point or port external to vending machine 150 along with one or more suppression and power conditioning hardware devices (not expressly shown) to guard against electronic attack.

Handheld device 140 may be operable to communicate with audit device 154 using software applications 144. Communication techniques including personal area networks (PAN) (e.g., a wireless communications system conforming to standards promulgated by the BLUETOOTH Special Interest Group trade association), local area networks (LAN) and wide area networks (WAN) may be used by an audit device 154 and/or handheld device 140. The audit device 154 and/or handheld device 140 may be operable to provide location information using commercially available global positioning systems (GPS).

Audit device 154 and/or handheld 140 may generate and package and communicate data across one or more external communication networks 124 via communication links 178 and 178a. Examples of such external communication networks may include wide area networks, public communication networks and client networks or private networks. Each of these networks may include a wide variety of wire-line transmission techniques and/or wireless transmission techniques. For example, public communication networks may include, but are not limited to, a public switched telephone network (PSTN), the internet, IP telephony, cable networks and a wide variety of wireless networks which are being developed in many communities for access by the general public. The boundaries or dividing lines between "conventional" wide area networks, public communication networks and client networks or private networks may be subject to substantial variations, overlaps and rapid change as communication technology and techniques are developed.

Also, as shown in FIG. 1, a network operations center (NOC) 126 may communicate with one or more audit devices across external network 124. NOC 126 is discussed in greater detail with respect to FIG. 2, below.

Figure 2:
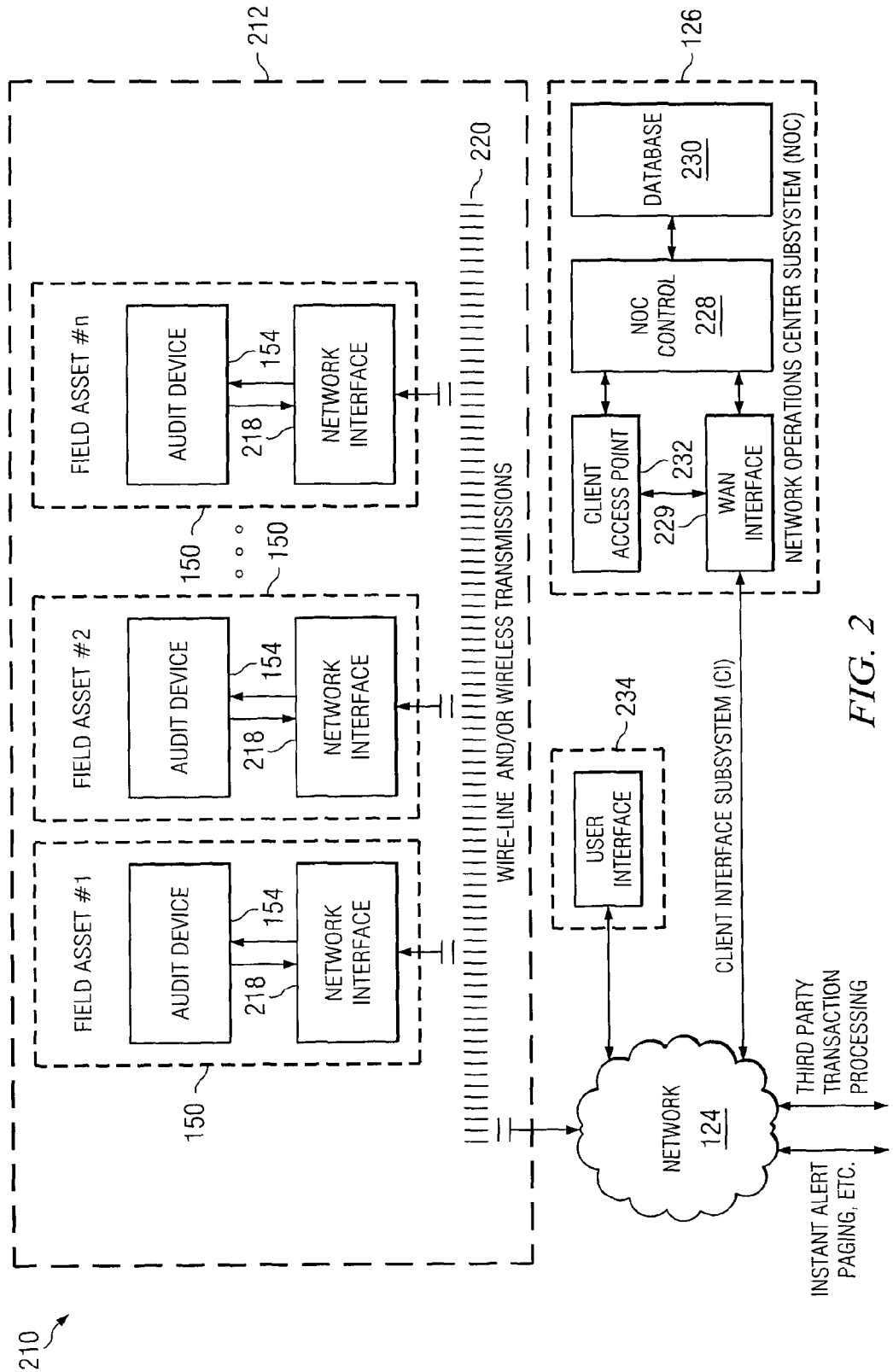
FIG. 2 illustrates a schematic drawing showing a block diagram of an example remote data acquisition system for field assets, in accordance with the present disclosure.

FIG. 2 a schematic drawing showing a block diagram of an example remote data acquisition system for field assets, indicated generally at 210, in accordance with the present disclosure. In general, system 210 of FIG. 2 may communicate information from a field asset site 212 externally over a wide area wireless or wire-line network 124 as well as internally over a local area wireless or wire-line network 220. An example of a field asset site 212, with respect to the vending machine industry, is a mall or other retail center with a plurality of field assets 150, e.g. vending machines, placed and/or installed at various locations throughout the mall or retail center. Field asset site 212 may include only one field asset 150 or a plurality of field assets 150.

As previously described with respect to FIG. 1, each field asset 150 may include an audit device 154. The audit device 154 of each field asset may include a network interface 218 for communicating via network 124 and the audit devices 154 of other field assets 150. The field assets 150 of FIG. 2 may include other components, such as those discussed with respect to FIG. 1, which are not shown in FIG. 2 for the purposes of clarity. Audit devices 154 may also communicate with one another and other devices coupled to network 124 via onboard wire-line interfaces or wireless transceivers using wire-line or wireless transmissions 220 respectively.

As shown in FIG. 2, a network operations center (NOC) 126 may communicate with one or more field asset sites 212 across network 124. In certain implementations, network operations center 126 may access mailboxes that store messages transmitted by network interfaces 218 of field assets 150. NOC 126 may also be integrated into a call center associated with a company operating field asset sites 212 or a company responsible for maintaining and servicing field asset sites 212.

In the embodiment of FIG. 2, network operations center 126 preferably includes a NOC control 228 that communicates with network 124 through a WAN interface 229. NOC control 228 may receive data acquired from and transmit data to field asset sites 212, process the data and store the data in a database 230. NOC control 228 may generate one or more reports using the data. NOC control 228 may also perform instant alert paging, direct dial alarms and other functions to provide real time notification to field asset site operators upon the occurrence of certain events (e.g., in a vending machine, out-of-stock, power outage, mix ratio violation, compressor failure, etc.). Accordingly, a reduction in the cost of service for field assets 150 may be realized through the present disclosure's ability to notify service personnel of a field asset problem as well as through system 210's ability to remotely diagnose and provide the possible problem with a field asset prior to the dispatching and/or notification of any such service personnel. NOC control 228 can also provide third party transaction processing such as allowing queries on database 230. The WAN interface 229 between NOC control 228 and the network 24 may be implemented through the use of either wire-line or wireless transmissions.

At network operations center 126, a client access point 232 may provide access from a client interface subsystem (CI) 234 across external network 124. In one implementation, client access point 232 may be implemented as a web-based interface allowing user access from a client computer across a network such as the Internet. Other implementations may include providing a direct-dial connection between client interface subsystem 234 and client access point 232. Once connected, a user may use client interface subsystem 234 to obtain information from database 230 based upon data acquired from field asset sites 212. Further, users may be provided with extended services such as trend information developed by mining and analyzing database 230.

From the standpoint of network configuration simplicity, it may be desirable that each network interface 218 at each field asset 150 include a wide area network interface each transmitting using the same protocol. In such a configuration, each network interface 218 may be operable to package data captured by its associated audit device 154 and communicate that data across network 124. However, placing in each field asset 150 a wide area network interface 218 capable of communication to NOC 126 may add unnecessary cost in terms of the initial hardware cost and other costs of operating the wide area network interfaces 218 (e.g., connection charges). Instead, cost efficiency may be attained by installing only one or a small number of wide area network interfaces 218 capable of communicating with NOC 126 over network 124, and using such WAN network interface 218 as a router or gateway for other field assets 150 at the field asset site 212, as depicted in FIG. 3.

Figure 3:
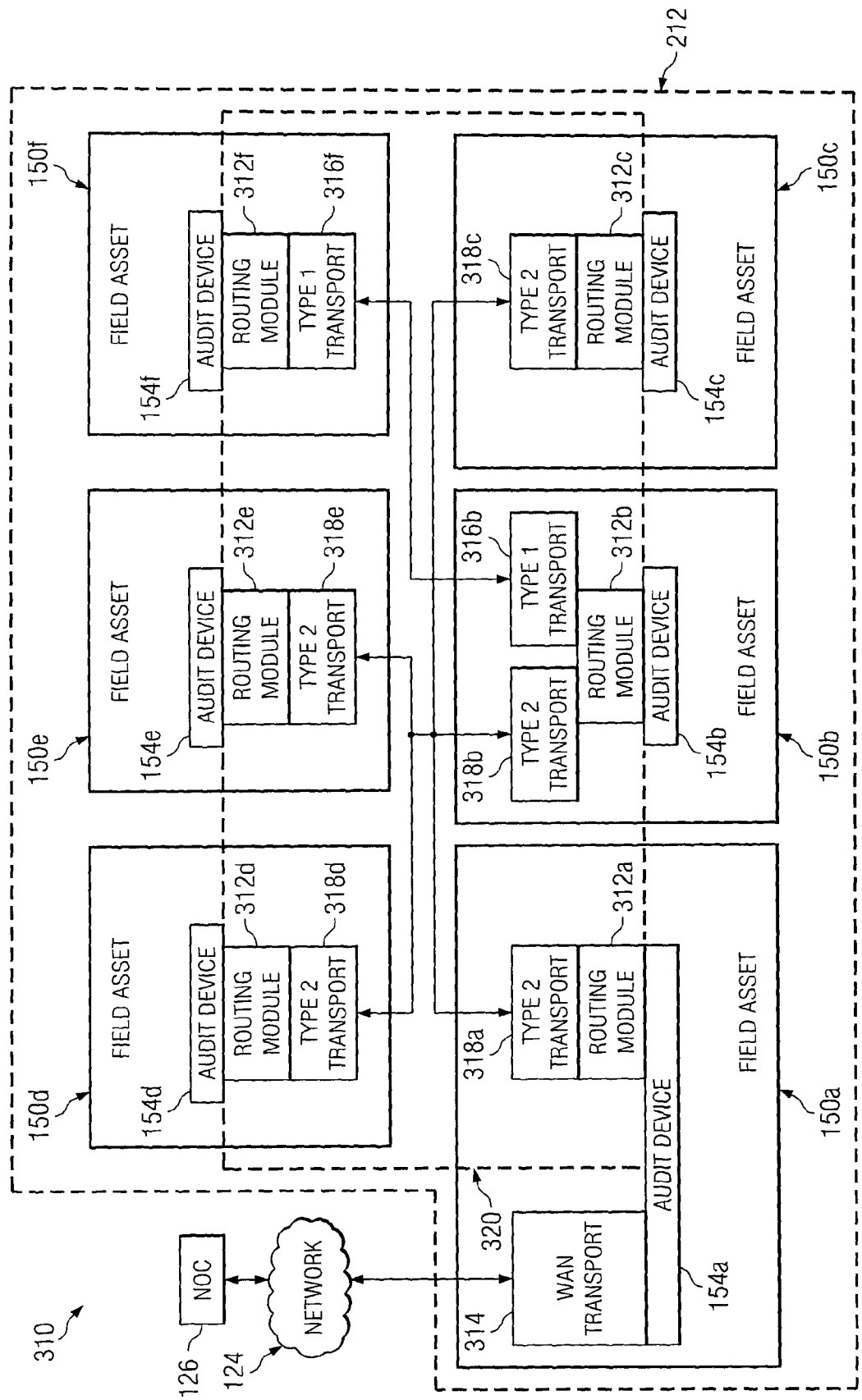
FIG. 3 illustrates a schematic drawing showing a field asset site including one or more field assets, in accordance with the present disclosure.

As depicted in FIG. 3, a field asset site 212 may include one or more field assets 150, each with a network interface 218 comprising a routing module 312 and one or more transport modules 314, 316, 318. Together, routing modules 312 and transport modules 314, 316 and 318 may enable field assets 150 to communicate with each other and NOC 126.

For example, field asset 150a may be enabled to communicate with NOC 126 over network 124 via wide area network (WAN) interface 314, and communicate directly via type 2 transport module 318a to other field assets 150b, 150c, 150d and 150e. Field asset 150b may be enabled to communicate directly via type 1 transport module 316b to field asset 150f. Together, the type 1 transport modules 316 and type 2 transport modules 318 of field assets 150 may form a local area network (LAN) that may be supported by wire-line and/or wireless transmissions. In addition, certain network interfaces 316 and 318 may also act as repeaters in situations in which particular network interfaces may not be enabled to and/or able to communicate directly to other network interfaces. For example, as depicted in FIG. 3, field asset 150f may not be able to communicate directly with field asset 150d, because field asset 150f has a type 1 transport module 316f while field asset 150d has a type 2 transport module. However, field asset 150b may be able to repeat and/or route to field asset 150d data sent to it by field asset 150f. As an illustration, field asset 150f may transmit data over its type 1 transport module 316f to type 1 transport module 316b of field asset 150b. The same data may be transmitted by field asset 150b via its type 2 transport module 318b to type 2 transport module 318d of field asset 150d.

In addition, field asset 150a, enabled with a WAN interface, may act as a router or gateway between network 124 and other field assets 150. Accordingly, field assets 150 may be able to communicate with NOC 126 by routing data to field asset

150*a*. For example, field asset 150*f* may communicate to NOC 126 by transmitting data over its type 1 transport module 316*f* to type 1 transport module 316*b* of field asset 150*b*. The same data may be transmitted by field asset 150*b* via its type 2 transport module 318*b* to type 2 transport module 318*a* of field asset 150*a*, which may then be transmitted by field asset 150*a*'s WAN transport module 314 to network 124.

By using a field asset site 212 configuration such as that depicted in FIG. 3, the cost of hardware, and the cost to maintain and operate such hardware may be reduced. For example, WAN transport module 314 of field asset 150*a* may comprise a wide area network-enabled interface operable to communicate with NOC 126 via network 124. In certain embodiments, NOC 126 may be at a location remote from field asset 150*a*, requiring transmission of data over a long distance. In addition, instead of installing potentially costly WAN-enabled network transport modules on each field asset 150 at field asset site 212, field assets 150*b*-150*f* may instead include transport modules 316 and 318 that may not be capable of transmitting data a distance as large as WAN transport module 314, but may be less costly and may leverage WAN transport module 314 to communicate to NOC 126. For example, type 1 transport modules 316 and type 2 transport modules 318 may comprise short-range transports, e.g. BLUETOOTH interface and/or communication protocol, and/or medium-range transports, e.g. the 900 MHz or 2.4 GHz communication bands. In a particular embodiment, field assets 150 located relatively close to one another may include shorter-range transports, while field assets separated by larger distances-may include mid-range or long-range transports. For example, field assets 150*a*-150*e* may be located at a particular location of a field asset site 212, say the north end. Because the devices are located proximate to each other, each may be enabled with a short-range transport module 318*a*-*e*, e.g. BLUETOOTH interface and/or communication protocol. On the other hand, field asset 150*f* may be located at a significant distance away from field assets 150*a*-150*e*, say the south end, where it would be unable to communicate using short-range communication and thus may be enabled with a mid- or long-range transport module 316*f*, e.g. the 900 MHZ or 2.4 GHz communication bands.

Unfortunately, while implementing a field asset site 212 with different types of communications transport modules 314-318 may reduce the hardware costs associated with the interfaces, such implementations may add technical complexity, and may be difficult to maintain. Thus, self-configuring and self-maintaining interface-independent methods and systems for communication among field assets using different transport types are desired.

Turning again to FIG. 3, each field asset 150 may include a routing module 312 interfaced between its associated audit device 154 and transport modules 316 and/or 318. Together, routing modules 312, type 1 transport modules 316, and type 2 transport modules 318 may form a "mesh" network 320. The mesh network 320 may create a layer of abstraction at field asset site 212, such that each audit device 154 may "see" mesh network 320 as a transport-independent network. Accordingly, if a particular audit device 154*b*-154*f* is not coupled to a WAN transport module 314, it may transmit a transport-agnostic message to its associated routing module 312. Mesh network 320 may then, as described in greater detail below, route such message through WAN-enabled audit device field asset to network 124.

Thus, in operation, routing module 312 may generally be operable to receive data from an audit device 154 of a field asset 150 and route it to a desired destination, for example NOC 126 or another field asset 150 as shown in greater detail with respect to FIGS. 4-8. Routing module 312 may also generally be operable to receive data from an associated transport module 316 or 318 and deliver the data to an associated audit device 154. In addition, routing module 212 may receive data from an associated transport module 316 and 318, process the data, and transmit the data via on or more of its associated transport modules 316 and 318.

To facilitate communication at field asset site 212, each routing module 312 may maintain a routing table, as depicted in FIGS. 4A and 4B. FIG. 4A illustrates an example routing table 402*a* that may be maintained on field asset 150*b*, in accordance with the present disclosure. Similarly, FIG. 4B illustrates an example routing table 402*b* that may be maintained on field asset 150*c*, in accordance with the present disclosure. Throughout this disclosure, routing tables 402*a* and 402*b* may collectively be referred to "routing tables 402" and individually referred to as "routing table 402." In some embodiments, routing tables 402 may include entries for all other field assets 150 to which a particular field asset is directly connected. In other embodiments, routing tables 402 may include entries for all other field assets 150 at a field asset site 212, regardless of connectivity among the various field assets 150.

As depicted in FIG. 4A, routing table 402*a* maintained by routing module 312*b* may track one or more parameters associated with the communicatively coupling between field asset 150*b* and other field assets 150. For example, the "Transport to Use" column may indicate the transport type that routing module 312*b* of field asset 150*b* should use in order to communicate "directly" with a particular field asset 150. In the specific implementation depicted in FIG. 3, a Type 2 transport may be used by routing module 312*b* to communicate with field assets 150*a*, 150*c*, 150*d* and 150*e*, and a Type 1 transport to communicate with field asset 150*f*. The "Next Transport Destination" column may indicate the transport module 316 or 318 to which routing module 312*b* of field asset 150*b* may communicate in order to communicate with a particular field asset 150.

As depicted in FIG. 4B, routing table 402*b* maintained by routing module 312*c* may track one or more parameters associated with the communicatively coupling between field asset 150*c* and a particular individual field assets 150*a*, 150*b*, 150*d*, and 150*e*. For example, the "Transport to Use" column may indicate the transport type that routing module 312*c* of field asset 150*c* should use in order to communicate "directly" with a particular field asset 150. In the specific implementation depicted in FIG. 3, a Type 2 transport may be used by routing module 312*b* to communicate with field assets 150*a*, 150*b*, 150*d*, 150*e* and 150*f*. The "Next Transport Destination" column may indicate the transport module 316 or 318 to which routing module 312*c* of field asset 150*c* may communicate in order to communicate with a particular field asset 150.

In the embodiment depicted in FIGS. 4A and 4B, routing tables 402 may only include connectivity information for field assets 150 which are "directly" coupled to the subject field asset 150*b* and 150*c* (e.g., those field assets 150 to which field asset 150*b* or 150*c* may communicate without using another field asset 150 as an intermediary). For example, FIG. 4B includes no entry for field asset 150*f*. Thus, in order to communicate a message, data and/or command from field asset 150*c* to field asset 150*f*, another field asset 150 (e.g., field asset 150*b*) may serve as an intermediary to forward the message, data and/or command, as described in greater detail below.

FIG. 5 illustrates a flow chart of an example method 500 for building routing tables 402, in accordance with the present disclosure. In one embodiment, method 500 includes detecting, by each transport module, all other similar-type transport modules within communication range, and communicating all detected transport modules to an associated routing module 312, in order to build routing tables 402.

According to one embodiment, method 500 preferably begins at step 502. Teachings of the present disclosure may be implemented in a variety of configurations of field assets 150 and field asset sites 212. As such, the preferred initialization point for method 500 and the order and identity of the steps 502-514 comprising method 500 may depend on the implementation chosen.

At step 502, one may install one or more field assets 150 at field asset site 212. At step 504, each field asset 150 may be configured with a routing module 312 and one or more transport modules 316, 318 to facilitate communication within mesh network 320. At step 506, each field asset 150 may be powered up.

At step 508, each type 1 transport module 316 may detect all other type 1 transport modules 316 within communication range. For example, type 1 transport module 316b of field asset 150b may detect that type 1 transport module 316f of field asset 150f is within type 1 transport module 316b's communication range. Similarly, at step 510, each type 2 transport module 318 may detect all other type 2 transport modules 318 within communication range. For example, type 2 transport module 318b of field asset 150b may detect that type 2 transport modules 318a, 318c, 318d and 318e are within type 2 transport 318b's communication range.

At step 512, each transport module 316, 318 may communicate the existence of the other detected transport modules to its associated routing module 312. For example, type 1 transport module 316b may communicate to routing module 312b that transport module 316f is within communication range of type 1 transport module 316b. Similarly, type 2 transport module 318b may communicate to routing module 312b that transport modules 318a, 318c, 318d and 318e are within communication range of transport module 318b.

At step 514, routing module 312 may use the information communicated at step 512 to build a routing table reflecting the transport connectivity of each field asset 150 to other field assets 150 at field asset site 212, such as routing tables 402, for example.

Although FIG. 5 discloses a particular number of steps to be taken with respect to method 500, it is understood that method 500 may be executed with greater or lesser steps than those depicted in FIG. 5. Method 500 may be implemented using field assets 150 or any other system operable to implement method 500. Method 500 may be implemented in hardware, software, or any combination thereof. In the same or alternative embodiments, method 500 may be implemented partially or fully in software embodied in tangible computer readable media.

Using the example method 500 depicted in FIG. 5, each routing module 312 may each automatically build its own routing table 402 without the need of manual entry of network connectivity information. Thus, in some respects, method 500 may enable mesh network 320 to be self-configuring. In addition, mesh network 320 may be "self-reconfiguring" or "self-healing" as set forth in FIG. 6.

Figure 6:
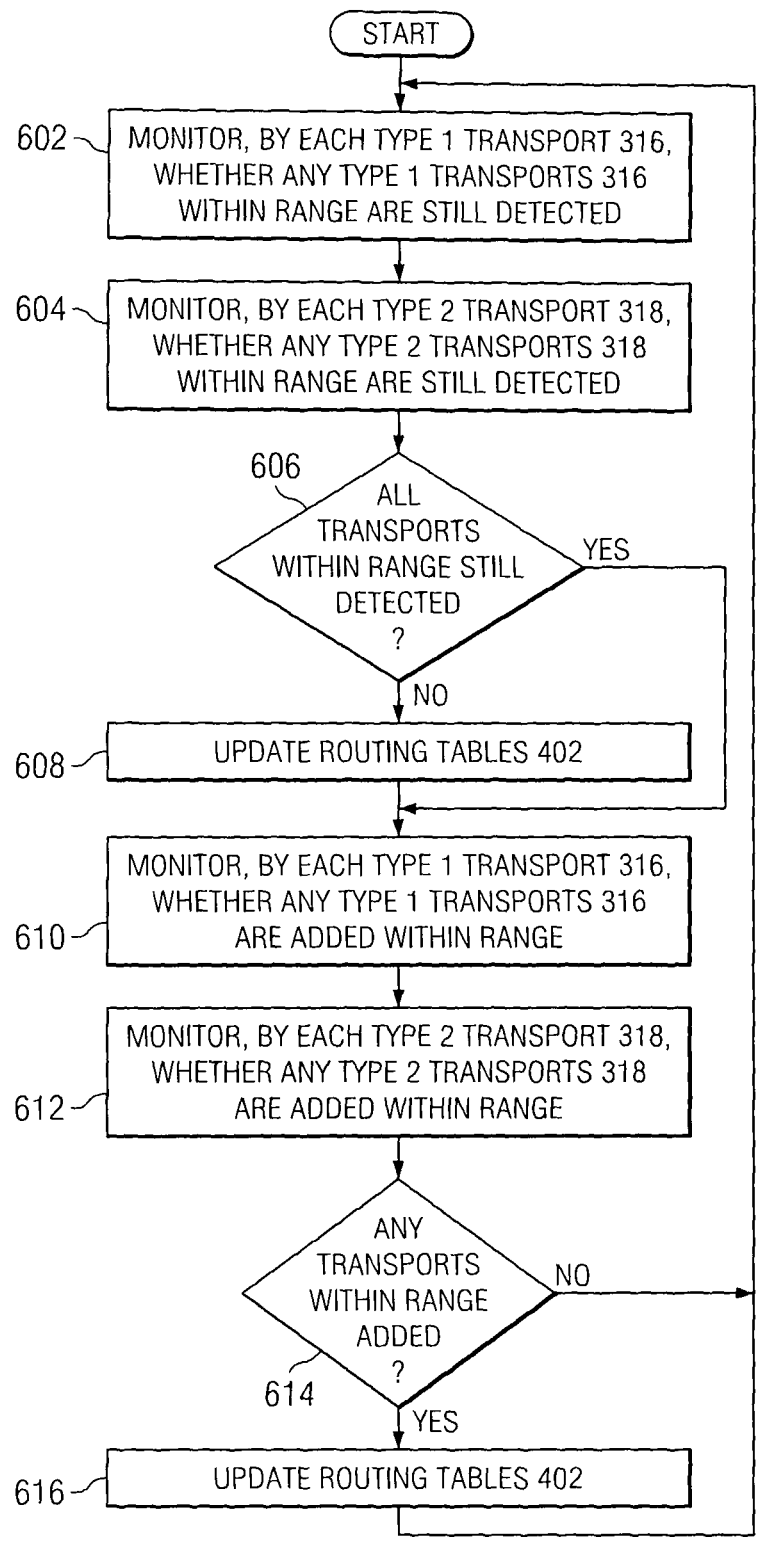
FIG. 6 illustrates a flow chart of an example method for maintaining a routing table, in accordance with the present disclosure.

FIG. 6 illustrates a flow chart of an example method 600 for maintaining routing tables 402, in accordance with the present disclosure. In one embodiment, method 600 includes monitoring, by each transport module, whether any of other similar-type transport modules within communication range are removed or added, and communicating all monitored changes to an associated routing module 312, in order to maintain routing tables 402.

According to one embodiment, method 600 preferably begins at step 602. Teachings of the present disclosure may be implemented in a variety of configurations of field assets 150 and field asset sites 212. As such, the preferred initialization point for method 600 and the order and identity of the steps 602-616 comprising method 600 may depend on the implementation chosen.

At step 602, each type 1 transport module 316 may monitor whether any other type 1 transport modules 316 within communication range are still detected. For example, type 1 transport module 316b may monitor whether transport module 316f is still detected within the communication range of 316b. Transport module 316f may no longer be detected within communication range of 316b for a variety of reasons. For example, transport module 316f may be physically removed from field asset 150f. As another example, field asset 150f housing transport module 316f may be removed from the communication range of transport module 316b. As yet another example, transport module 316f may stop operating, due to malfunction, error, powering off, and/or other reasons.

Similarly, at step 604, each type 2 transport module 318 may monitor whether any other type 2 transport modules 318 within communication range are still detected. For example, type 2 transport module 318b may monitor whether transport modules 318a, 318c, 318d and 318e remain detected within the communication range of type 2 transport module 318b.

At step 606, each routing module 312 may poll its associated transport modules or receive communication from its associated transport modules to determine whether all transport modules previously in communication range are still detected by its transport modules. If all transport modules remain detected (for example, if transport module 316b is still able to detect transport module 316f, and transport module 318b is still able to detect transport modules 318a, 318c, 318d and 318e), method 600 may proceed to step 610. Otherwise (for example, if transport module 316b is no longer able to detect transport module 316f, and transport module 318b is no longer able to detect at least one of transport modules 318a, 318c, 318d and 318e), method 600 proceeds to step 608.

At step 608, each routing module 312 may update its associated routing table 402 in light of those transport modules determined to no longer be in range at steps 602-606. For example, if at step 602, transport module 316b determines that transport module 316f could no longer be detected, routing module 312b may, at step 608, update routing table 402a to reflect that field asset 150f is no longer connected to field asset 150b via type 1 transport connectivity.

At step 610, each type 1 transport module 316 may monitor whether any additional type 1 transport modules 316 have come within communication range. For example, type 1 transport module 316b may monitor whether a new type 1 transport module other than transport module 316f is detected within the communication range of 316b. A "new" type 1 transport module 316 may be detected for a variety of reasons. For example, a new transport module 316 may be physically added to a field asset 150 already existing at field asset site 212. As another example, a new field asset 150 housing a transport module 316 may be added within communication range of transport module 316b. Similarly, at step 612, each type 2 transport module 318 may monitor whether any additional type 2 transport modules 318 come within communication range.

At step 614, each routing module 312 may poll its associated transport modules and/or receive communication from its associated transport modules to determine whether any new transport modules are detected by its transport modules. If no new transport modules are detected (for example, if transport module 316b does not detect a new type 1 transport module other than transport module 316f, and transport module 318b does not detect a new type 2 transport module other than transport modules 318a, 318c, 318d and 318e), method 600 may proceed to step 602, where the monitoring processes of steps 602, 604, 610 and 612 may be repeated. Otherwise (for example, if either of transport module 316b or 318b detects a new transport module), method 600 proceeds to step 616.

At step 616, each routing module 312 may update its associated routing table 402 in light of any new transport modules detected at steps 610-612. For example, if at step 612, transport module 318b determines that a new transport module 318f was added to field asset 150f, routing module 312b may, at step 616, update routing table 402a to reflect that field asset 150f is connected to field asset 150b via type 2 transport connectivity.

Although FIG. 6 discloses a particular number of steps to be taken with respect to method 600, it is understood that method 600 may be executed with greater or lesser steps than those depicted in FIG. 6. Method 600 may be implemented using field assets 150 or any other system operable to implement method 600. Method 600 may be implemented in hardware, software, or any combination thereof. In the same or alternative embodiments, method 600 may be implemented partially or fully in software embodied in tangible computer readable media.

Using the example method 600 depicted in FIG. 6, each routing module 312 may each automatically maintain its own routing table 402 without the need of manual entry of network connectivity information. Thus, in some respects, method 600 may enable mesh network 320 to be "self-reconfiguring" and/or "self-healing."

Figure 7:
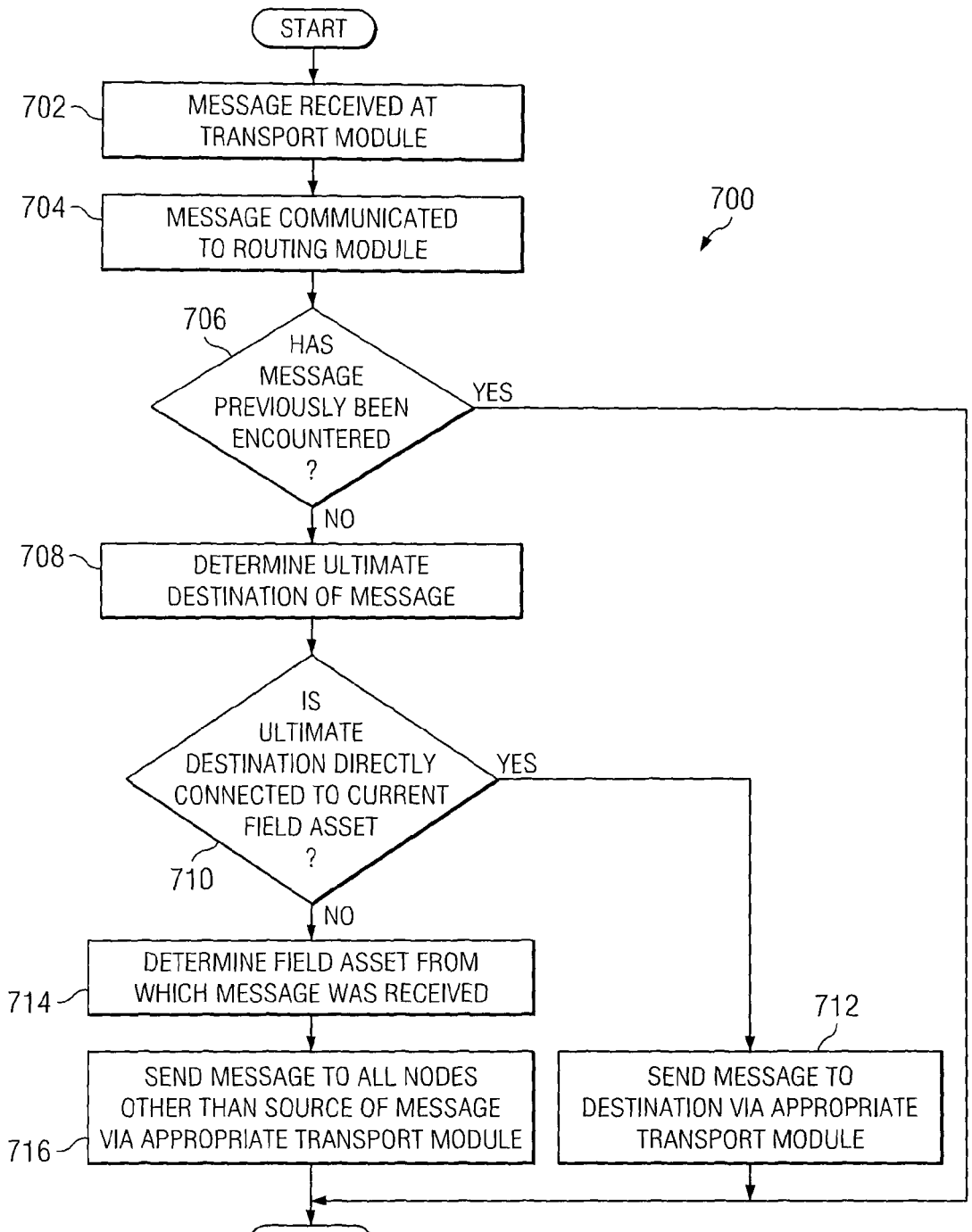
FIG. 7 illustrates a flow chart of an example method of receiving and forwarding a message in a field asset, in accordance with the present disclosure.

FIG. 7 illustrates a flow chart of an example method 700 of receiving and forwarding a message in a field asset 150, in accordance with the present disclosure. In one embodiment, method 700 includes receiving a message at a transport module 316, 318, processing the message by routing module 312, and sending the message to one or more field assets 150 via a transport module 316, 318.

According to one embodiment, method 700 preferably begins at step 702. Teachings of the present disclosure may be implemented in a variety of configurations of field assets 150 and field asset sites 212. As such, the preferred initialization point for method 700 and the order and identity of the steps 702-716 comprising method 700 may depend on the implementation chosen.

For the sake of simplicity, method 700 will be described with respect to the receipt, processing, and transmittal of a message at field asset 150b. However, it is understood that method 700 and/or similar methods may be utilized in connection with any suitable field asset 150.

At step 702, a message may be received at either of transport module 316b or 318b of field asset 150b. At step 704, the message may then be communicated to routing module 312b for processing. At step 706, routing module 312b may determine whether or not the message has been previously encountered by routing module 312b. Receipt of a previously encountered message may indicate that routing module 312b has already processed and/or appropriately routed the message, and thus the message requires no further handling by routing module 312b. Accordingly, if the message has previously been encountered, the message may be discarded and method 700 may end. Otherwise, if the message has not been previously encountered, method 700 may proceed to step 708.

At step 708, routing module 312b may determine the particular field asset 150 that is to be the ultimate destination of the message. This determination may be made in any suitable manner. For example, the message may include a field, a tag, and/or information indicating its ultimate destination. Consequently, routing module 312b may be able to parse or process the message to determine the ultimate destination. At step 710, routing module 312b may determine if the ultimate destination is directly connected to field asset 150b. In some embodiments, this determination may be made by examining routing table 402.

If the ultimate destination is directly connected to field asset 150b, method 700 may proceed to step 712, where routing module 312b may transmit the message via one of its associated transport modules 316b and/or 318b to the destination. For example, if the ultimate destination is field asset 150a, routing module 312b may transmit the message via its type 2 transport module 318b, where the message would be received by type 2 transport module 318a of field asset 150a, and forwarded to routing module 312a for further processing.

On the other hand, if field asset 150b is not directly coupled to the ultimate destination of the message, method 700 may proceed to step 714. At step 714, routing module 312b may determine the particular field asset 150 from which field asset 150b received the message. This determination may be made in any suitable manner. For example, the message may include a field, a tag, and/or information indicating the field asset 150 from which field asset 150b received the message. Consequently, routing module 312b may be able to parse or process the message to determine which field asset 150 from which field asset 150b received the message. At step 716, routing module 312b may transmit the message via one or more of its associated transport modules 316b and/or 318b all field assets 150 other than the field asset from which it received the message. For example, if the source is field asset 150d, routing module 312b may transmit the message via its type 1 transport module 316b to type 1 transport module 316f of field asset 150f, and via its type 2 transport module 318b to type 2 transport modules 318a, 318c and 318e or field assets 150a, 150c and 150e, respectively. The routing modules 312 of the field assets 150 that received the message from field asset 150b may further route the message to its ultimate destination. In this example, the message need not be sent to field asset 150d, as its respective routing module 312d may have already appropriately processed and routed the message.

Although FIG. 7 discloses a particular number of steps to be taken with respect to method 700, it is understood that method 700 may be executed with greater or lesser steps than those depicted in FIG. 7. Method 700 may be implemented using field assets 150 or any other system operable to implement method 700. Method 700 may be implemented in hardware, software, or any combination thereof. In the same or alternative embodiments, method 700 may be implemented partially or fully in software embodied in tangible computer readable media.

Using the example message processing method 700 outlined in FIG. 7, any suitable message may be communicated throughout field asset site 212. For example, from time to time, audit device 154f of field asset 150f may need to communicate data to NOC 126. However, in the implementation of field asset site 212 shown in FIG. 3, field asset 150f does not have WAN services or connectivity, and hence does not directly interface to network 124. Consequently, the message and/or data to be communicated from audit device 154f to NOC 126 must be routed to field asset 150*a*, which does possess WAN services or connectivity, as illustrated in FIG. 8.

Figure 8:
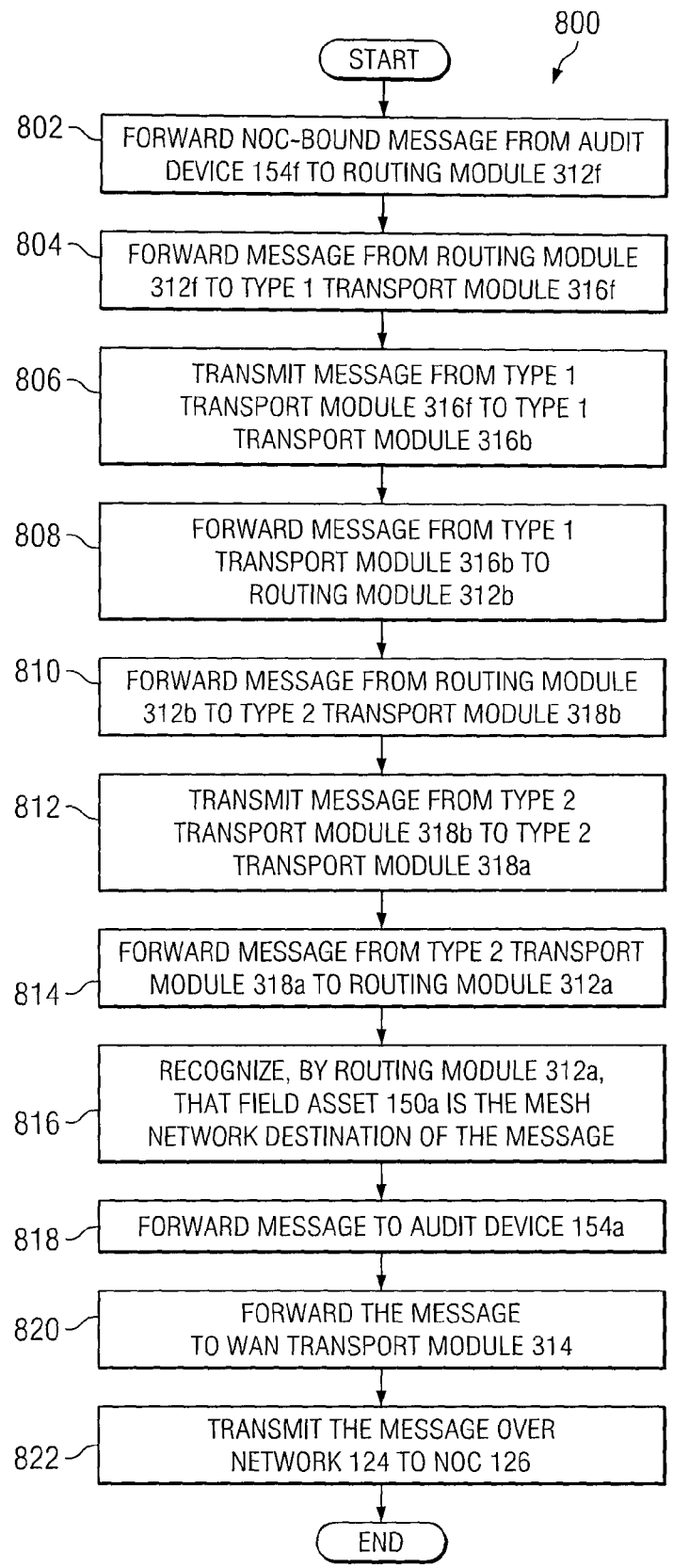
FIG. 8 illustrates a flow chart of an example method of routing a message from an audit device of a field asset to a network operations center, in accordance with the present disclosure.

FIG. 8 illustrates a flow chart of an example method 800 of routing a message from audit device 154*f* of field asset 150*f* to NOC 126, in accordance with the present disclosure. In one embodiment, method 800 includes transmitting a message from field asset 150*f*, routing the message through one or more field assets 150, and ultimately sending the message via network 124 to NOC 126.

According to one embodiment, method 800 preferably begins at step 802. Teachings of the present disclosure may be implemented in a variety of configurations of field assets 150 and field asset sites 212. As such, the preferred initialization point for method 800 and the order and identity of the steps 802-822 comprising method 800 may depend on the implementation chosen.

For the sake of simplicity, method 800 will be described with respect to the transmission of a message from field asset 150*f* to NOC 126. However, it is understood that method 800 and/or similar methods may be utilized in connection with the transmission of data and/or message of any field asset 150 to NOC 126, or vice versa. In addition, method 800 and/or similar methods may be utilized in connection with the transmission of data between individual field assets 150.

At step 802, audit device 154*f* of field asset 150*f* may forward a NOC-bound message to routing module 312*f*. As mentioned previously, routing module 312*f* is part of mesh network 320 which may appear as a transport-independent network to audit device 154*f*. Accordingly, audit device 154*f* may not need format the message to comply with a specific transport protocol.

At step 804, routing module 312*f* may format the message in accordance with the communication protocol for type 1 transport module 316*f*, and forward the message to type 1 transport module 316*f*. In addition, routing module 312*f* may add a field, tag and/or other information to the message to indicate that the message is bound for NOC 126, may add a field, tag, and/or other information to the message to indicate that the message requires WAN connectivity and/or WAN services, and/or may add a field, tag and/or other information to the message to indicate that routing transport module 312*a* of field asset 150*a* is destination of the message within mesh network 320. At step 806, the message may be transmitted from type 1 transport module 316*f* to type 1 transport module 312*b* of field asset 150*b*. At step 808, the message may be forwarded from transport module 316*b* to routing module 312*b*, similar to as described with respect to step 704 of method 700.

At step 810, routing module 312*b* may format the message in accordance with the communication protocol for type 2 transport module 318*b*, and forward the message to type 2 transport module 318*b*. In certain embodiments, routing module 312*b* may also format the message in accordance with the communication protocol for type 1 transport module 316*b*, and forward the message to type 2 transport module 316*b*. At step 812, the message may be transmitted from type 2 transport module 318*b* to type 2 transport module 318*a*. The transmission of the message in steps 610-612 may be similar to steps 506-516 of method 700.

At step 814, the message may be forwarded from type 2 transport module 318*a* to routing module 312*a*. At step 816, routing module 312*a* may recognize that, from the standpoint of mesh network 320, routing module 312*a* is the destination of the message. This recognition may be made in any suitable manner. For example, as discussed above the message may the message may include a field, a tag, and/or other information indicating that the message is a NOC-bound message, requires WAN connectivity and/or services, and/or that routing module 312*a* is the mesh network destination. Consequently, routing module 312*a* may be able to parse or process the message to determine that routing module 312*a* is the mesh network 320 destination of the message.

At step 818, routing module 312*a* may forward the message to audit device 154*a*. As mentioned previously, mesh network 320 may appear as a transport-agnostic network to audit device 154*a*. Accordingly, audit device 154*a* may not need to perform any transport protocol translation with respect to the message.

At step 820, audit device 154*a* may recognize that the message is intended to be delivered to NOC 126, and may forward the message to WAN transport module 314. From WAN transport module 314, the message may be transmitted over network 124 to NOC 126.

Although FIG. 8 discloses a particular number of steps to be taken with respect to method 800, it is understood that method 800 may be executed with greater or lesser steps than those depicted in FIG. 8. Method 800 may be implemented using field asset site 212 or any other system operable to implement method 800. Method 800 may be implemented in hardware, software, or any combination thereof. In the same or alternative embodiments, method 800 may be implemented partially or fully in software embodied in tangible computer readable media.

In addition, although the discussion of FIG. 8 above discusses the routing of a message to NOC 126 using WAN connectivity or services, the systems and methods described above may be used to route a message, data, command, and/or request to any suitable service. For example, if a message is to be communicated to a print server, methods and systems identical or similar to those disclosed above may be employed to route the message to an appropriate print server. Under such example, the print server may be though of as analogous to the NOC 126 discussed above. As further examples, the systems and methods described above may be used to route a message, data, command, and/or request to a time service (e.g., a device that maintains and/or communicated the current time), a password validation service, a firmware update service (e.g., a device that stores and/or distributes firmware to field assets), and/or any other suitable service.

Although the discussion above contemplates the use of a WAN transport module and two other transport types at field asset site 212, it is understood that field asset site 212, mesh network 320, and each field asset 150 may support any number and type of suitable transports. In addition, although FIG. 3 depicts a field asset site 212 including six field assets 150, it is understood that field asset site 212 may include any number of field assets. Also, although FIG. 3 depicts field asset 150*a* as having WAN transport module 314 interfacing with network 124, it is understood that more than one field asset 150 at field asset site 212 may have a WAN transport module 314 that may interface with network 124.

Furthermore, in certain implementations of field asset site 212, none of field assets 150 may have a WAN transport module 314 that may interface with network 124. In such cases, data may be communicated to and from one or more field assets 150 using handheld device 140. In such embodiments, field assets 150 configured to communicate directly with handheld device 140 may act as intermediaries between handheld device 140 and any field assets 150 not configured to communicate directly with handheld device 140, using methods and systems similar or analogous to those discussed above. In addition, data may be communicated to and from field assets 150 using any other suitable system, apparatus or device. For example, a service vehicle equipped with a transport module suitable to communicate directly with one or more field assets 150 may be used. In certain embodiments, the service vehicle may be able to interface with field asset site 212 by driving within the communication range of field assets 150 enabled to communicate with the service vehicle. In such an embodiment, a service technician could evaluate the service needs of field asset site 212 "curbside" upon nearing the field asset site 212, but without leaving the service vehicle, thus possibly saving time.

Although the present disclosure and its advantages have been described in detail, it should be understood that various changes, substitutions and alterations may be made thereto without departing from the spirit and scope of the disclosure as defined by the following claims.

What is claimed is:

1. A vending machine associated with a group of vending machines, at least one vending machine of the group of vending machines including a wireless transceiver configured to communicate with a remote operations center relative to the group of vending machines, the vending machine comprising:
   a mesh network wireless transceiver configured to (i) detect mesh network wireless transceivers in other vending machines of the group of vending machines, and (ii) selectively establish wireless communications with one or more of the mesh network wireless transceivers in the other vending machines;
   a hardware connection configured to selectively physically connect to the wireless transceiver; and
   a communication routing application executing in one of one or more controllers within the vending machine, the communication routing application configured to control wireless communications from the vending machine via both the mesh network wireless transceiver within the vending machine and, when present within the vending machine, the wireless transceiver,
   wherein the one or more controllers are configured to:
      control and monitor one or more payment devices and one or more vending devices within the vending machine,
      collect information regarding one or more of sales by the vending machine, a status of the one or more payment devices and the one or more vending devices, currency accumulated within the one or more payment devices, and inventory remaining within the vending machine,
      generate reports regarding the collected information for the operations center, and
      transmit the reports regarding the collected information to the communication routing application for transmission to the operations center independent of whether the cellular communications wireless transceiver is present within the vending machine or within one of the other vending machines and independent of wireless communication connections established by the mesh network wireless transceiver within the vending machine with the mesh network wireless transceivers in the other vending machines, and
   wherein the communication routing application is configured to forward the reports received from the one or more controllers to the operations center using an available communications path comprising one or more of a wireless communication connection established by the mesh network wireless transceiver within the vending machine with the mesh network wireless transceiver in one of the other vending machines and a wireless communication connection between the cellular communications wireless transceiver and the operations center.

2. The vending machine of claim 1, wherein the communication routing application is configured to operate as a relay when necessary to establish communication between one of the other vending machines and the operations center.

3. The vending machine of claim 1, wherein the mesh network wireless transceiver within the vending machine and the mesh network wireless transceivers in the other vending machines each comprise a wide area network transceiver.

4. The vending machine of claim 2, wherein the mesh network wireless transceiver within the vending machine and the mesh network wireless transceivers in the other vending machines are each selected from a group consisting of a 900 mega-Hertz (MHz) radio frequency transceiver, a 2.4 GHz radio frequency transceiver, an infra-red transceiver, a laser transceiver, and an 802.11 transceiver.

5. The vending machine of claim 1, wherein the cellular communications wireless transceiver is selected from a group consisting of a narrowband personal communication system transceiver, a broadband personal communication system transceiver, a circuit switched cellular transceiver, and a cellular digital packet data transceiver.

6. The vending machine of claim 1, wherein the operations center is a network operations center.

7. The vending machine of claim 6, wherein the network operations center is configured to receive operation data from the group of vending machines.

8. The vending machine of claim 1, wherein the communication routing application is configured to automatically provide communications via a handheld device between the vending machine and the operations center.

9. The vending machine of claim 1, wherein the communication routing application is configured to automatically provide communications via a service vehicle between the vending machine and the operations center.

10. The vending machine of claim 1, wherein the communication routing application is part of a field audit device.

11. The vending machine of claim 1, wherein the one or more controllers include a controller within a field audit device.

12. The vending machine of claim 1, wherein the one or more controllers include a vending machine controller.

13. A method of operating a vending machine associated with a group of vending machines, at least one vending machine of the group of vending machines including a wireless transceiver configured to communicate with a remote operations center relative to the group of vending machines, the vending machine including a hardware connection configured to selectively physically connect to the wireless transceiver, the method comprising:
   utilizing a mesh network wireless transceiver:
      detecting mesh network wireless transceivers in other vending machines of the group of vending machines, and
      selectively establishing wireless communication connections with one or more of the mesh network wireless transceivers in the other vending machines;
   executing a communication routing application in one of one or more controllers within the vending machine to control wireless communications from the vending machine via both the mesh network wireless transceiver and, when present within the vending machine, the wireless transceiver, and transmitting communications from the vending machine to the operations center via the wireless transceiver when the wireless transceiver is present within the vending machine and via the mesh network wireless transceivers when the wireless transceiver is not present within the vending machine; and
utilizing the one or more controllers,
- controlling and monitoring one or more payment devices and one or more vending devices within the vending machine,
- collecting information regarding one or more of sales by the vending machine, a status of the one or more payment devices and the one or more vending devices, currency accumulated within the one or more payment devices, and inventory remaining within the vending machine,
- generating reports regarding the collected information for the operations center, and
- transmitting the reports regarding the collected information to the communication routing application for transmission to the operations center independent of whether the cellular communications wireless transceiver is present within the vending machine or within one of the other vending machines and independent of wireless communication connections established by the mesh network wireless transceiver within the vending machine with the mesh network wireless transceivers in the other vending machines, wherein the communication routing application is configured to forward the reports received from the one or more controllers to the operations center using an available communications path comprising one or more of a wireless communication connection established by the mesh network wireless transceiver within the vending machine with the mesh network wireless transceiver in one of the other vending machines and a wireless communication connection between the cellular communications wireless transceiver and the operations center.

14. The method of claim 13, further comprising:
operating the communication routing application as a relay when necessary to establish communication between one of the other vending machines and the operations center.

15. The method of claim 13, wherein the mesh network wireless transceiver within the vending machine and the mesh network wireless transceivers in the other vending machines each comprise a wide area network transceiver.

16. The method of claim 13, wherein the mesh network wireless transceiver within the vending machine and the mesh network wireless transceivers in the other vending machines are each selected from a group consisting of a 900 megaHertz (MHz) radio frequency transceiver, a 2.4 GHz radio frequency transceiver, an infra-red transceiver, a laser transceiver, and an 802.11 transceiver.

17. The method of claim 13, wherein the cellular communications wireless transceiver is selected from a group consisting of a narrowband personal communication system transceiver, a broadband personal communication system transceiver, a circuit switched cellular transceiver, and a cellular digital packet data transceiver.

18. The method of claim 13, wherein the operations center is a network operations center.

19. The method of claim 18, wherein the network operations center is configured to receive operation data from the group of vending machines.

20. The method of claim 13, further comprising:
utilizing the communication routing application, automatically providing communications via a handheld device between the vending machine and the operations center.

21. The method of claim 13, further comprising:
utilizing the communication routing application, automatically providing communications via a service vehicle between the vending machine and the operations center.

22. The method of claim 13, wherein the communication routing application is part of a field audit device.

23. The method of claim 13, wherein the one or more controllers include a controller within a field audit device.

24. The method of claim 13, wherein the one or more controllers include a vending machine controller.

* * * * *